United States Patent
Saum et al.

[11] 3,898,497
[45] Aug. 5, 1975

[54] INFRARED CAMERA TUBE

[75] Inventors: George A. Saum, Florissant, Mo.; Hans G. Sippach, Syracuse, N.Y.

[73] Assignee: The United States of America as represented by the Secretary of the Air Force, Washington, D.C.

[22] Filed: Oct. 1, 1970

[21] Appl. No.: 77,357

[52] U.S. Cl. ............... 313/388; 250/338; 250/353; 315/10
[51] Int. Cl. ............................................. H01j 31/49
[58] Field of Search ............ 250/338, 353; 313/101, 313/1 R, 388; 315/10, 11

[56] References Cited
UNITED STATES PATENTS

| | | | |
|---|---|---|---|
| 2,928,971 | 3/1960 | Redington et al. | 313/80 X |
| 2,967,961 | 1/1961 | Heil | 315/10 X |
| 3,324,327 | 6/1967 | Koda | 313/101 X |
| 3,376,465 | 4/1968 | Corpew | 313/10 |
| 3,444,375 | 5/1969 | Seamans, Jr. | 250/83.3 IR |
| 3,588,570 | 6/1971 | O'Keeffe | 313/101 X |

*Primary Examiner*—Maynard R. Wilbur
*Assistant Examiner*—S. C. Buczinski
*Attorney, Agent, or Firm*—Joseph E. Rusz; Jacob N. Erlich

[57] ABSTRACT

An infrared camera tube which has a cathode, cathode aperture, focusing lens aperture, photoconductor and obscuring flap. The obscuring flap is located between the cathode and the photoconductor so as to block the undesirable infrared radiation therebetween.

1 Claim, 2 Drawing Figures

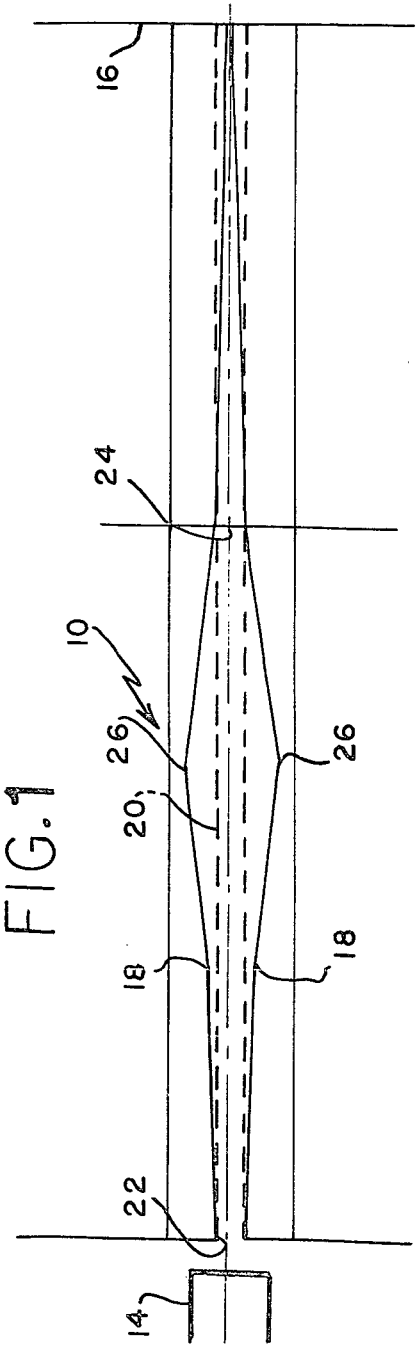
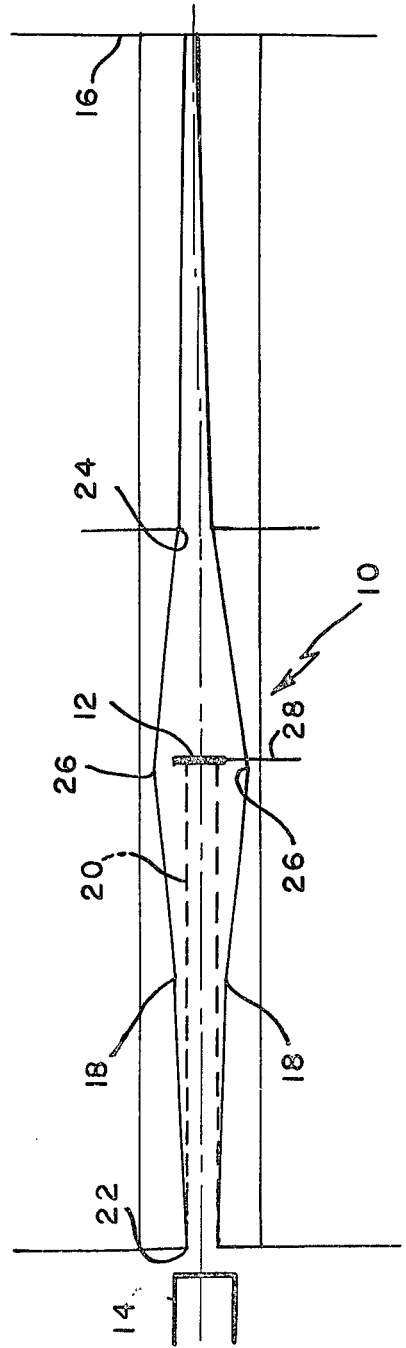

INFRARED CAMERA TUBE

BACKGROUND OF THE INVENTION

This invention relates generally to infrared camera tubes and, more particularly, to an infrared camera tube in which the infrared radiation from a hot thermionic cathode is prevented from reaching the photoconductor.

In conventional vidicon-type camera tubes, a cathode electrode is utilized to generate an electron beam that is focused on the area of a photoconducting element or target upon which a scene is imaged. The heated cathode electrode (near 1,000°K) produces infrared rays along with the electron beam. These infrared rays, although incident upon the target, do not affect the output signal because the target of the conventional camera tube is insensitive to these rays.

The infrared detecting system makes use of the fact that all physical objects emit infrared radiation. The amount and kind of radiation depends upon the temperature of the object and its emissivity. Thus, when the objects are viewed by an appropriate infrared detecting system, any object at a different effective temperature stands out from its surroundings. Since the thermionic cathode electrode in infrared camera tubes operate near 1000°K considerable infrared radiation is generated. This radiation shines through the aperture in an electron gun, down the tube axis, and onto the infrared photoconductor. Unlike the target in the conventional camera tubes, the target of an infrared camera tube is sensitive to infrared rays. Thus, an undesirable photoconduction takes place in the central portion of the photoconductor or target. This reduces the sensitivity of the center of the photoconductor and produces a troublesome white area in the center of the picture.

Many methods have been attempted in the elimination of these undesirable infrared rays. For example, the R. W. Redington et al U.S. Pat. No. 2,928,971 dated Mar. 15, 1960 and the Saum et al U.S. Pat. No. 2,947,896 dated Aug. 2, 1960 by one of the inventors of this application, disclose complex procedures for eliminating these infrared rays. In fact, other systems such as cool tunnel emitters and field emitter points have also been utilized in trying to present a simple and effective way of removing the infrared rays. To date, however, these systems although somewhat effective usually prove to be extremely expensive and complex in construction. Heretofore, there has yet to be devised a system of removing infrared rays in an infrared camera tube which is botn highly reliable and extremely simple in operation.

SUMMARY OF THE INVENTION

The instant invention sets forth a system of eliminating infrared rays in an infrared camera tube which overcomes all the problems set forth hereinabove.

A conventional infrared camera tube has a hot cathode electrode which produces an electron beam to be utilized in conjunction with an infrared sensitive photoconductor. The cathode also generates a considerable amount of infrared radiation which in the case of an infrared camera tube is highly undesirable. In order to prevent the infrared radiation from reaching the photoconductor the infrared camera tube of this invention utilizes the fact that the electrons do not travel in exact straight lines, but travel in somewhat curved trajectories. The infrared radiation, however, does travel in a substantially straight line.

In the infrared camera tube of the instant invention a small flap, preferably of a good heat insulating material, is suspended in front of the cathode of the infrared camera tube. The diameter of the flap is of such a size as to block out the infrared radiation, yet allow for the flow of electrons to pass around it. An electrical lens is then utilized to refocus the electron beam onto the infrared photoconductor. It is the instant invention which prevents the undesirable affect of having infrared radiation pass to the photoconductor, and does so with a minimum of parts.

It is therefore an object of this invention to provide an infrared camera tube which has an obscuring flap therein to block infrared radiation from reaching the photoconductor.

It is another object of this invention to provide a system to block infrared radiation in an infrared camera tube which is economical to produce and which utilizes conventional, currently available components that lend themselves to standard, mass-producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWING

FIG. 1 is a schematic drawing of the infrared camera tube of this invention with the obscuring flap out of position; and FIG. 2 is a schematic drawing of the infrared camera tube of this invention with the obscuring flap in position.

DETAILED DESCRIPTION OF THE EMBODIMENT

Reference is now made to FIG. 1 of the drawing which shows the infrared camera tube 10 of this invention with the obscuring flap 12 (FIG. 2) out of position. The infrared camera tube 10 is made up of a conventional cathode electrode 14 and an infrared sensitive photoconductor 16. The photoconductor 16 has a layer of any photoconductive material, such as germanium or silicon, suitably doped with impurities, that is coated on the rear with a conductor film. The number of electrons from the beam 18 emanating from cathode 14 which passes through the photoconductive material at any point on photoconductor 16 depends upon the amount of infrared radiation at that point. Therefore, as shown in FIG. 1, any infrared radiation 20 also emanating from cathode 14 which passes to photoconductor 16 is highly undesirable.

As shown in FIG. 2, the infrared camera tube 10 of this invention is further made up of an electron gun aperture or cathode aperture 22 located adjacent cathode 14 and a focus lens aperture 24 located proximate photoconductor 16. An obscuring flap 12 made of any suitable non-magnetic material, such as Stainless Steel 305 or Titanium which has undergone an outgassing process is located within camera tube 10 at a point 26 where the electrons begin to curve or bulge. The obscuring flap 12 is of a diameter at least as great as gun aperture 22 but not so great as the diameter of the bulge. The specific size of the obscuring flap 12 allows for the infrared radiation 20 to be blocked but permits the electrons 18 to pass to photoconductor 16. The flap 12 may be mounted within camera tube 10 by any conventional mounting arrangement 28. Focus lens aperture 24 redirects the electron beam 18 to photoconductor 16.

MODE OF OPERATION

Referring again to FIG. 2, in operation the obscuring flap 12 is positioned within camera tube 10 at the area 26 of the enlarged electron beam 18. Upon actuation of the cathode 14, any infrared radiation 20 is blocked by the obscuring flap 12 while the electron flow 18 upon being refocused by lens aperture 24 passes on to photoconductor 16. Thereafter the infrared camera tube 10 of this invention functions as any ordinary infrared camera tube.

Although the invention has been described with reference to a particular embodiment, it will be understood to those skilled in the art that this invention is also capable of a variety of alternate embodiments within the spirit and scope of the appended claims.

We claim:

1. In an infrared camera tube having a cathode for producing an electron beam and a photoconductor the improvement therein comprising a cathode aperture of predetermined diameter located coincidental with the axis of said cathode, an electrical focus lens located proximate said photoconductor for refocusing said electron beam, an obscuring flap of heat insulating, nonmagnetic material located intermediate said cathode aperture and said focus lens at a point where said electron beam begins to bulge, said obscuring flap having a diameter at least as great as said predetermined diameter but not so great as the diameter of said bulge whereby an infrared radiation emanating from said cathode is blocked by said obscuring flap and the electrons pass to said photoconductor.

* * * * *